United States Patent Office 2,912,367
Patented Nov. 10, 1959

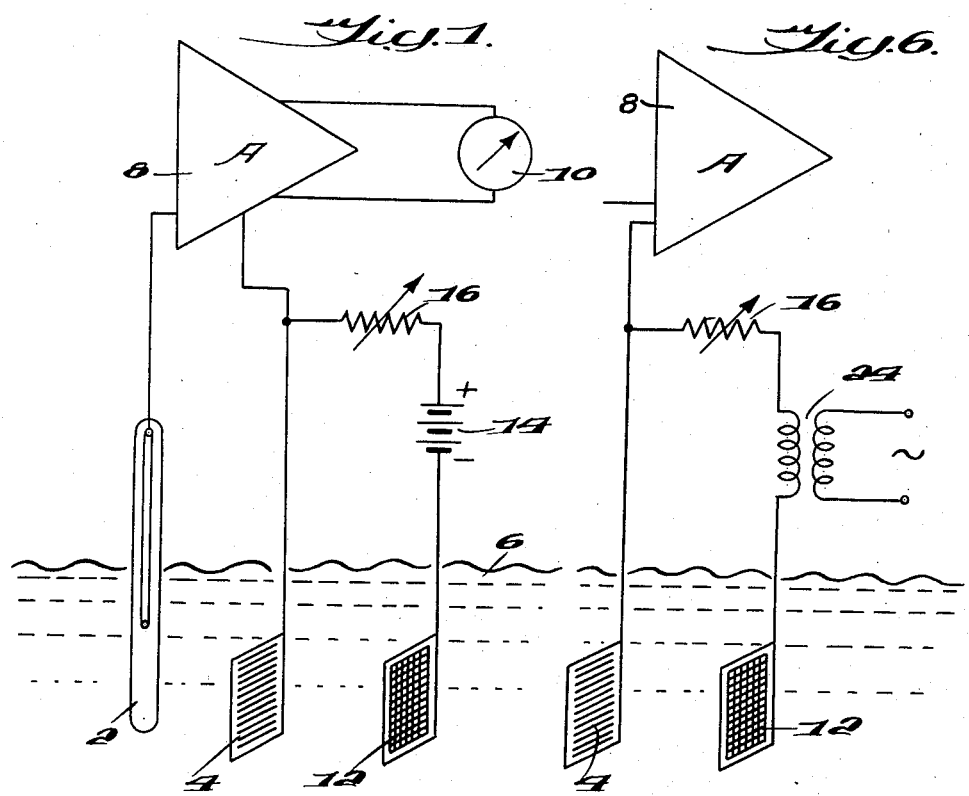

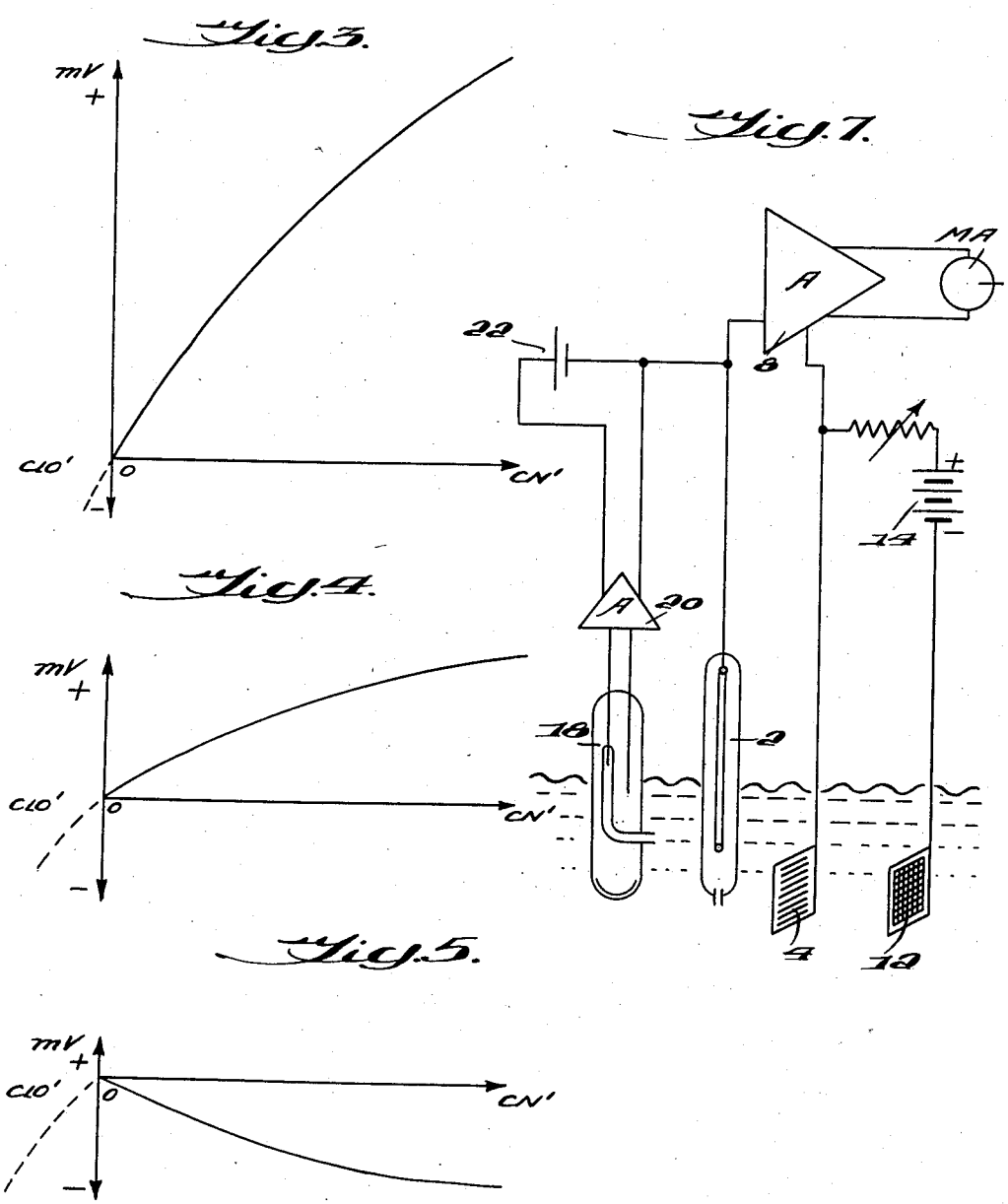

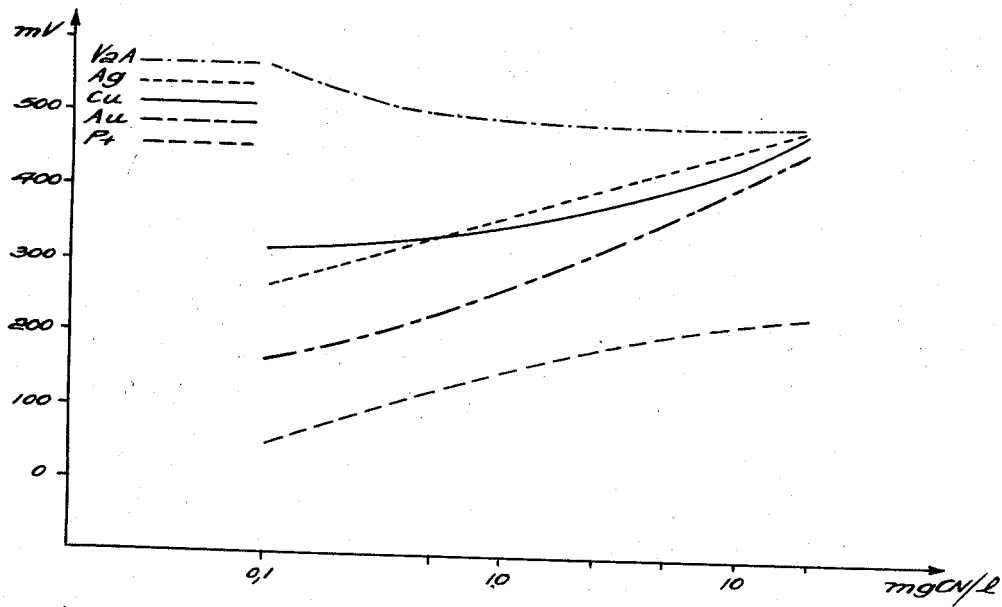
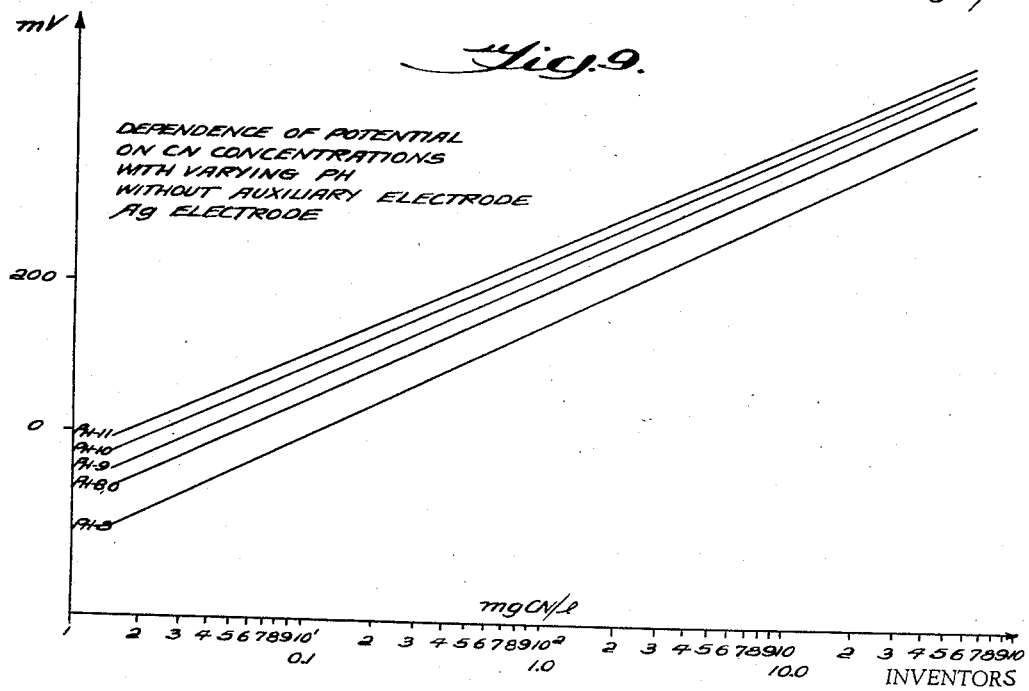

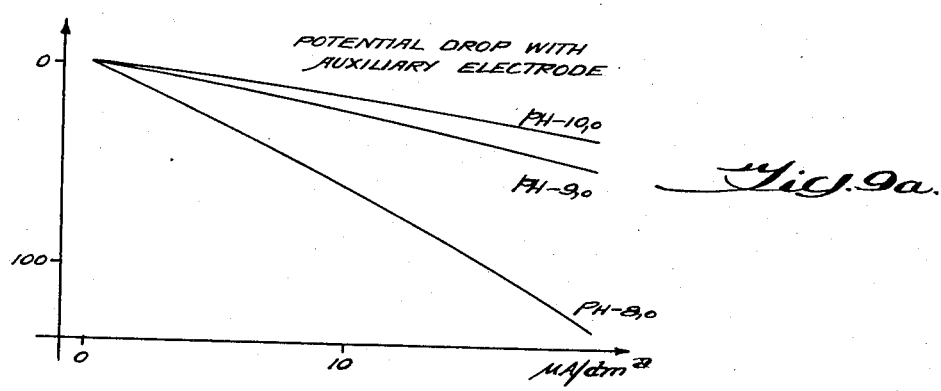
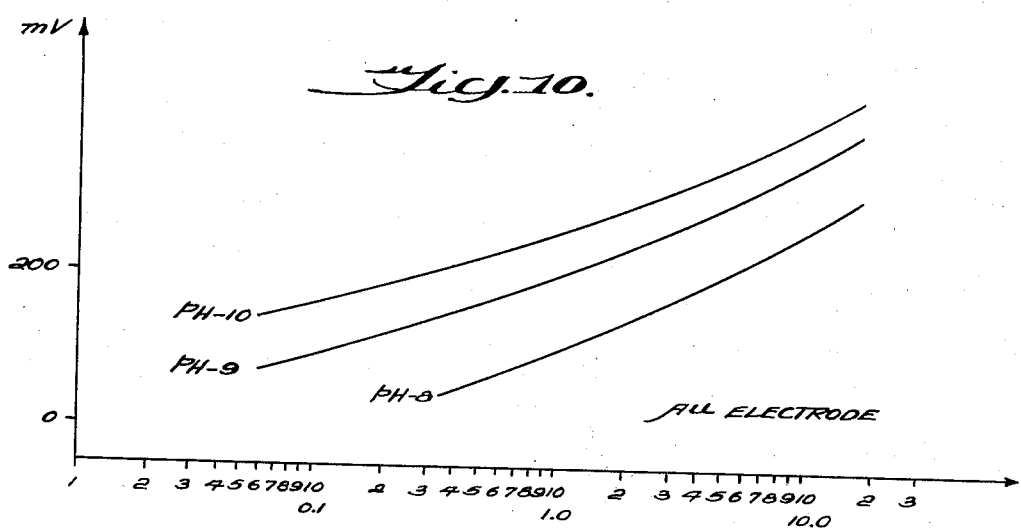
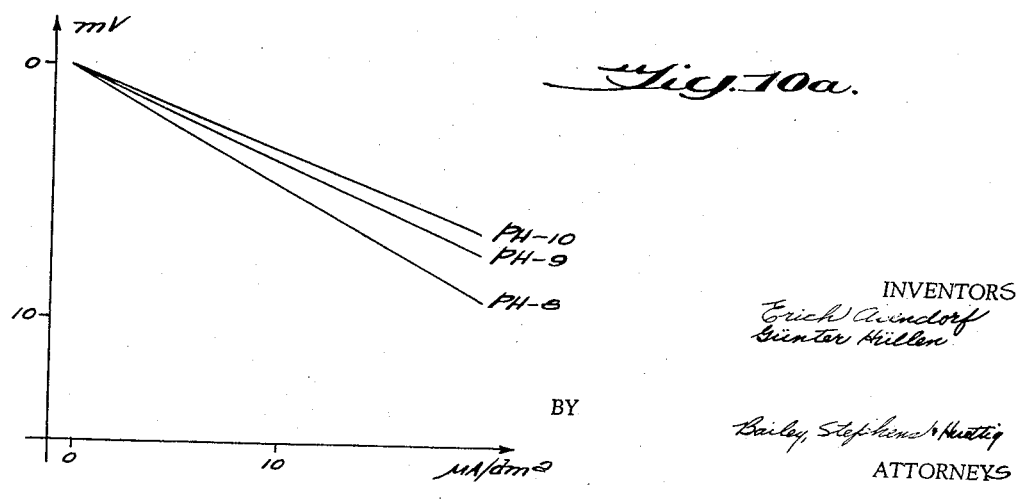

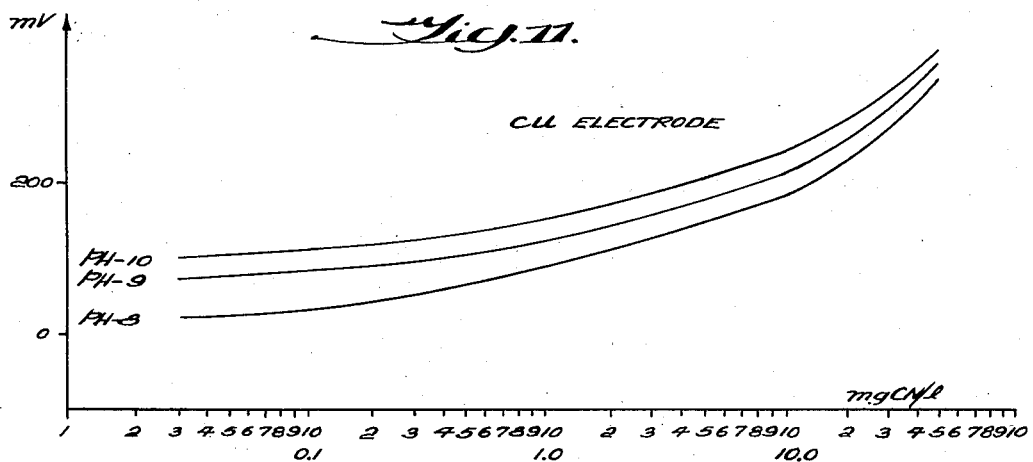
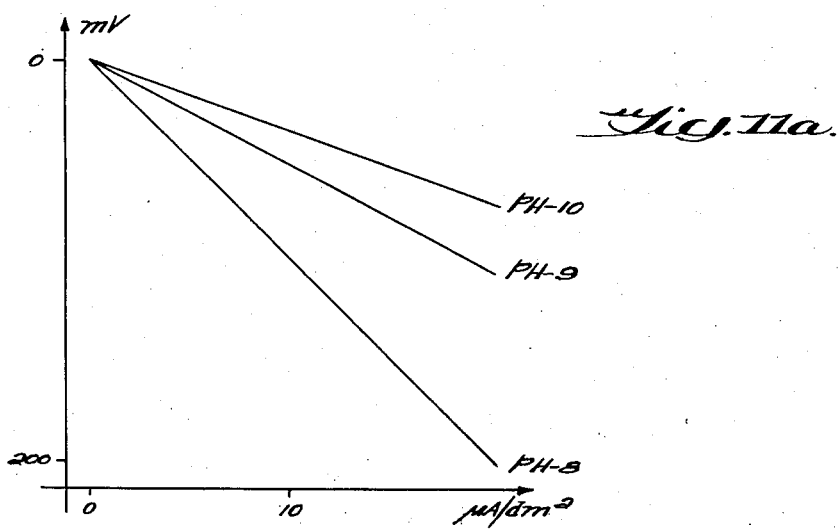
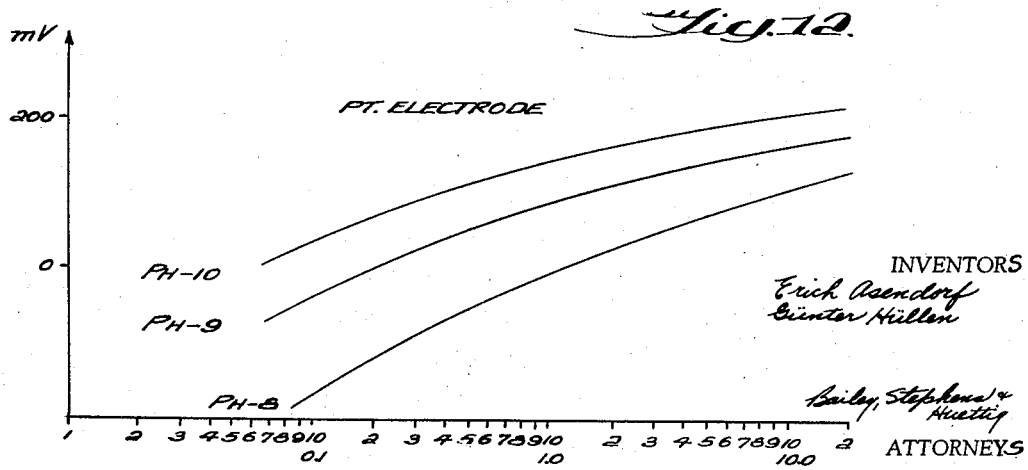

2,912,367

MEASUREMENT OF CYANIDE CONCENTRATION

Erich Asendorf, Bad Homburg, and Günter Hüllen, Dusseldorf, Germany, assignors to Deutsche Gold- und Silber-Scheideanstalt vormals Roessler, Frankfurt am Main, Germany Application November 12, 1957, Serial No. 695,653

Claims priority, application Germany April 26, 1957

13 Claims. (Cl. 204—1)

The invention relates to the measurement of concentrations of cyanide ions in aqueous solution, and more particularly to a method and apparatus for such measurement. It is particularly directed to the measurement of cyanide ion concentrations in waste solutions which are to be detoxified.

The detoxification of cyanide-containing waste water, which in many manufacturing operations is produced in substantial quantities, is carried out by oxidation of the cyanide to cyanate or to carbon dioxide and nitrogen by means of chlorine or hypochlorites. Under industrial conditions, the measurement of the concentrations of cyanide ions in the waste water plays a substantial role in the purification procedure.

In contrast to what has previously been believed, it has now been found that the reaction between the cyanide and the hypochlorite ion is dependent upon the time so that during the process cyanide ions and chlorine ions can exist side by side in the waste water for a substantial length of time. Testing of the waste water to determine whether there is any chlorine in it therefore gives no true indication as to whether poisonous cyanide is passing out with the waste water in the outflow or not.

A number of different methods have been used for measuring the cyanide ion concentration of a solution. Chemical analysis and optical measurement procedures are known. It is also known how to measure the cyanide concentration potentiometrically, for example, with a pair of electrodes, of which one electrode is composed essentially of a concentrated cyanide solution, while the other electrode is of pure silver.

If, with these electrode arrangements, the cyanide ion concentration in the solution changes, then also the build-ing up of the Nernst double layer on the silver surface must vary, if the silver electrode is to show correctly the cyanide ion concentration. It has been observed that this occurs with increasing cyanide ion concentrations, but not with decreasing concentrations. In the latter case, the potential indication of the silver electrode is erroneous, lagging up to several hours behind the changes of cyanide ion concentration in the solution. Also, this measuring method fails in particular for the smallest cyanide concentrations and for higher ones, while decreasing concentrations will yield only inaccurate measuring values.

In general, cyanide containing waste waters, such as those from galvanizing or hardening plants, will be alkaline because of their contamination with ions of different origin, and will have a conductivity of at least 100 microsiemens or more. It has now been found that, in waste waters or solutions where the conductivity is above 100 $\mu S$, the cyanide concentration can be measured potentiometrically using a silver electrode if, in addition to the potential providing electrode, which can be in the conventional form of a calomel electrode, the silver electrode is impressed continuously or intermittently with an auxiliary current. It is believed that the auxiliary current, in that it makes the silver electrode at least to a small degree a dissolving anode, contributes to the fact that the Nernst double layer is maintained in equilibrium with the passing solution. The result is a practically instantaneously correct indication of the cyanide ion concentration in the solution.

The auxiliary electrode can also be formed of a base metal which is in close proximity to silver in the electromotive series, such as copper, whereby the potential of this auxiliary electrode is influenced by the presence of the measuring solution.

It has further been found that, with the foregoing arrangement, the cyanide ion concentration can be measured without being influenced by the composition of the measuring solution if the auxiliary electrode is charged by a separate current source, and if an electrode of silver or a metal more precious than silver in the electromotive series such as gold or platinum is used. The silver electrode can consist of fine silver or platinum or a nobler metal than silver and can be formed of electrolytic, thermally cast or mechanically worked silver.

This electrode and current arrangement according to the invention detects or gives with higher speed very exact and very completely reproduceable measurements of the cyanide contained in solution even at the lowest possible concentration, for example, 0–10 mg. CN/l. In the alkaline measuring range, the electrode arrangement is furthermore surprisingly insensitive to pH variations, to the presence of metal ions in the solution and to changes of conductivity. The measuring values are also not influenced by chlorine, acid or hypochlorite ions. As to ammonium ions in concentrations which do not exceed the maximum concentration to be tested for cyanide ions, the electrode arrangement is almost insensitive. It is true that in this case changes of the potential value will be observed, but these lie in such a range that they are without importance for the control of a detoxification procedure.

With this arrangement for the measurement and control of the detoxification, the procedure can be regulated solely through measurement of the existing cyanide ions which are present either as complex compounds or as free ions in the solution, so that the nature of the detoxifying medium (hypochlorite, chloride, ferrosulfate, ozone or electrolytically produced oxygen) is of no importance for the operation because the detoxifying medium acts first in the measuring procedure in a different manner when the last cyanide ions are decomposed. It has been proven that the detoxifying medium can indicate solely a redox potential which cannot be accomplished by the presence of cyanide in the solution or that the Nernst double layers of complex compounds produced by the potential so overlie the measurement electrode that no detectable differences in measuring accuracy is produced. This is particularly surprising in view of the fact that also in the alkaline range of between pH 7.0 and about 10.0, hypochlorite and cyanide ions can remain side by side for a long time in the concentration, which would, because of the chlorine as well as of the cyanide, be absolutely deadly to life in the discharge water. In this arrangement also only the concentration of cyanide ions in the waste water will be determined.

It has furthermore been found that metals baser or more noble than silver can be used for the electrode and also metals which are baser than silver in the electromotive series for the measuring and auxiliary electrodes, in the latter case especially if the measuring and auxiliary electrodes are composed of the same metal. The sole condition is that a metal must be used which is able to build up on the measuring electrode complex cyanides as Nernst double layers with the cyanide ions existing in the solution to be measured. It is also a question in practical use, since zinc and iron cannot be used because of their corrodability, of metals of the electromotive series from copper up to the platinum metal group. It is also for certain purposes desirable to use alloys of these metals with each other, or with a baser metal if the added ingredient improves the metal which is baser than copper.

The object of the present invention therefore is to provide an improved method and apparatus for the measurement of cyanide ion concentrations in aqueous solution.

Further objects and advantages of the invention will appear more fully from the following description particularly when taken in conjunction with the accompanying drawings which form a part thereof.

In the drawings:

Fig. 1 shows diagrammatically a measuring arrangement embodying the invention;

Fig. 2 shows readings obtained with the arrangement of Fig. 1;

Figs. 3 to 5 show the results obtained when using different electrodes;

Fig. 6 shows a modification of the measuring arrangement;

Fig. 7 shows still another modification;

Fig. 8 shows the results obtained when using different metals as the measuring electrode without any auxiliary electrode;

Figure 12A:
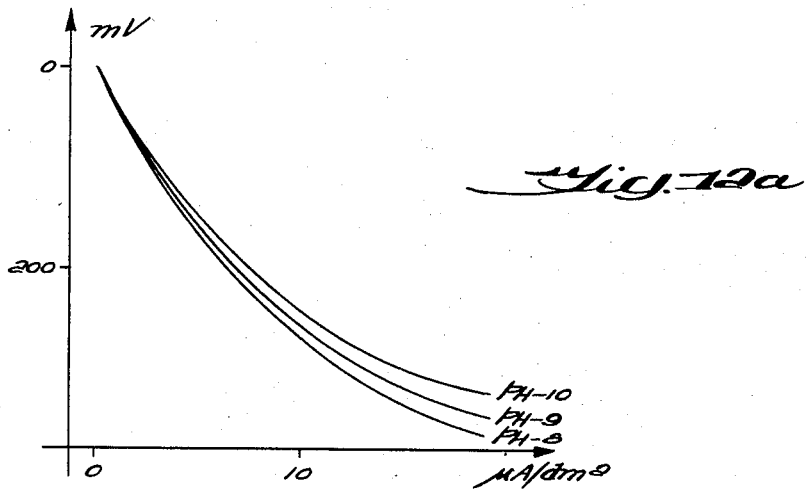
Figure 13:
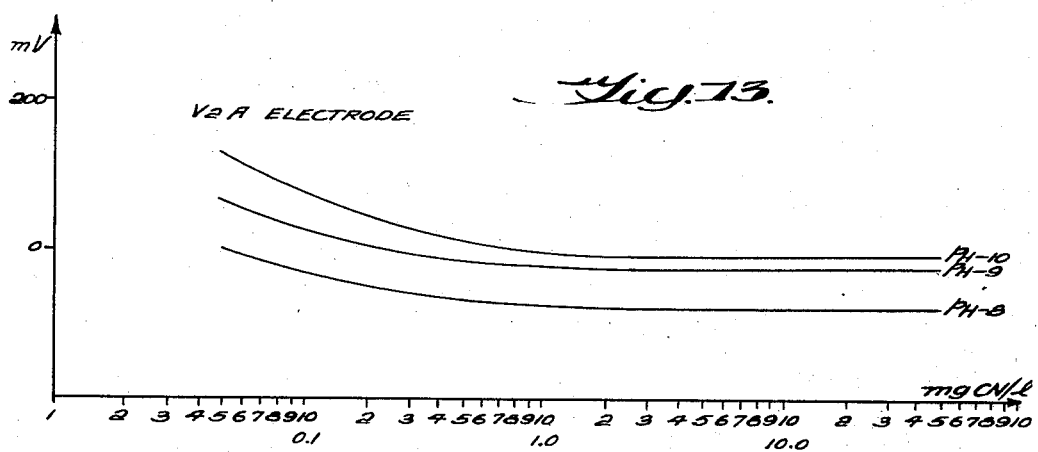
Figure 13A:
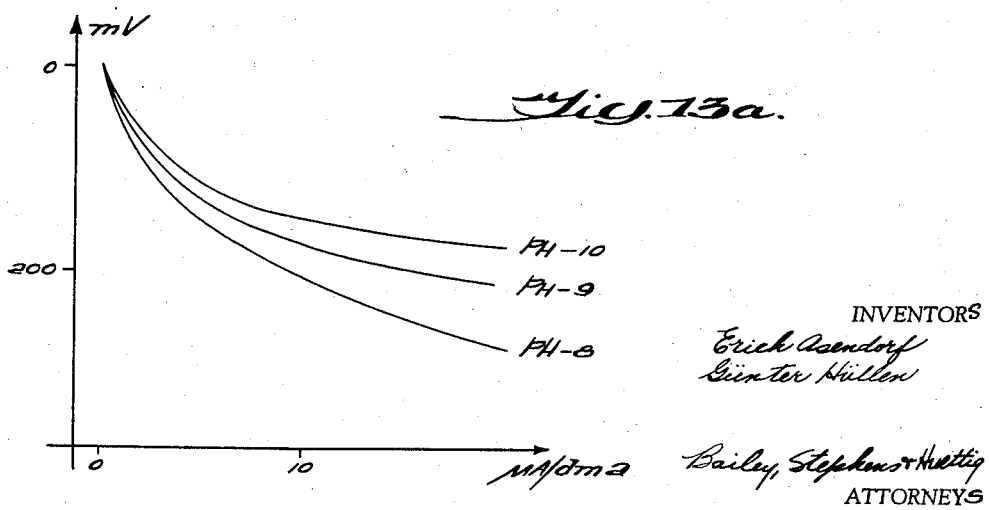

Figs. 9 to 13 show the dependence of the potential on the cyanide concentration at different pH's without an auxiliary electrode and with measuring electrodes formed of different metals; and Figs. 9a to 13a show for the metals of Figs. 9 to 13 respectively the difference in potential produced at various pH's utilizing an auxiliary electrode, in relation to the current imposed by the auxiliary electrode.

In the arrangement of Fig. 1, a calomel electrode 2 and a measuring electrode 4 which is formed of pure silver are immersed in the cyanide-containing solution 6. These electrodes are connected to an amplifier 8, the output of which is fed to an ammeter or measuring instrument 10. This arrangement is conventional and is disclosed for example, in Archiv für Elektrotechnik, vol. 35 of the year 1941 pages 477 to 489 and pages 533 to 549.

According to the invention an auxiliary electrode 12 is also immersed in the cyanide solution and is connected across battery 14 and variable resistor 16 to the line between the measuring electrode 4 and the amplifier 8. This is so connected as to impose a positive charge on the electrode 4.

The auxiliary electrode may be formed of gold. With a voltage of 4 volts, the potentiometer 16 can be adjusted to impose a current of 3 microamperes.

Fig. 2 shows the relationship of the values between the cyanide ion concentration and the reading of the instrument with the arrangement of Fig. 1.

Fig. 3 shows the relationship between the indications of the measuring instrument and the cyanide concentration using copper for the measuring and auxiliary electrodes and a calomel reference electrode. Fig. 4 is a similar diagram using platinum for the measuring and auxiliary electrodes.

It is also possible to use for the measuring and auxiliary electrodes a nickel-iron alloy (V2A), composed of iron with about 0.07% to 0.15% carbon, about 18% chromium and 8.5% to 9.5% nickel; however, such electrodes do not give the same type of results as silver, copper or platinum. As shown in Fig. 5, whereas a stronger exposure of the measuring electrode to hypochlorite ions in the absence of cyanide ions leads to an even stronger drop in potential, the maximum potential drop is found in this arrangement at the stoichiometric neutral point at which neither hypochlorite nor cyanide ions are found in the solution.

This measuring result can also be obtained if the only requirement is for an indication that a particular solution is free of cyanide ions (maximum indication) or if an uncertain concentration of cyanide ions is to be measured in a solution in which no hypochlorite ions are present.

The invention advantageously provides an auxiliary current flowing from the auxiliary electrode to the measuring electrode of a few $\mu A/dm^2$, for example, from 5 to 20 $\mu A/dm^2$. These currents are high enough to give accurate measurements but are chosen low enough so that they will not evolve hydrogen at the electrodes or bring the metal of the electrodes into solution.

It has also been found, especially in concentrations between 0.001 and 0.1 to 1 mg. CN/l., that the indication is dependent on the pH, because especially in this arrangement the potential drop which is obtainable through the coating with the Nernst double layer between the metal of the measuring element and the reference electrode is so small that pH changes noticeably vary the measurement. This fluctuation of the zero point in the range of small cyanide ion concentrations is indeed absolutely unimportant for the control of a detoxification procedure with addition of a suitable oxidizing medium or of a complex-forming substance to a cyanide-containing solution. But it can be of some importance if the procedure is intended only to measure exactly small cyanide concentrations within this range. In such cases, it is desirable to provide an arbitrarily high zero point. This can be obtained by working in an alkaline range between pH 7 and pH 11, and by connecting into the arrangement a pH electrode, for example, a glass electrode, which balances the potential deviations which occur under the influence of the changing pH, care being taken in the procedure to maintain a high pH, as, for instance, 11.0.

An arrangement of this type is shown in Fig. 7. In addition to the structure shown in Fig. 1, a glass electrode 18 is connected by an amplifier 20 and battery 22 to the line which connects reference electrode 2 to the rectifier 8.

It has furthermore been found that the measurement observed may depend on the speed with which the adjustment of equilibrium between the Nernst double layer and the concentration in the solution take place, and further may depend on the diffusion speed. It has been established that the measurement of cyanide concentrations in solutions gives particularly readable values if the measuring solution is kept in motion and moves past the measuring electrode with a constant velocity, so that the diffusion factor in the solution plays no part. The measurement will therefore be made preferably in a so-called "free-flow electrode," or at least in a moving medium.

It has furthermore been observed that the measurements show a fixed hysteresis for three to six minutes if the electrode is coated with a layer of silver oxide or silver chloride. This effect cannot occur, when working with the arrangement according to the invention, if the measuring electrode is maintained in an excess of hypochlorite solution for some time, for example, two days, or in a strong alkaline solution and if an auxiliary current flow for this period between the measuring and auxiliary electrodes. This hysteresis can be avoided by other precautions. For instance, it is possible to treat a silver chloride layer on the measuring electrode with a dilute ammonium solution for a few minutes or a silver oxide layer for several minutes with a sodium cyanide solution with a concentration of at least 50 mg./l.

The previously described hysteresis can also be avoided electrochemically by directing an auxiliary current across the metal electrode which is so strong that hydrogen is evolved in the solution or a slight amount of the metal of the measuring electrodes goes into solution. It has also been found that, surprisingly, the hysteresis also disappears if the measuring electrode is depolarized with the auxiliary electrode for a long period of time, such as thirty to sixty minutes. Also a permanent depolarization produced by causing an alternating current to flow between the measuring and auxiliary electrodes leads to a smaller result. With this there may occur, in the range of the smallest cyanide concentrations, under certain circumstances an oversensitivity of the potentiometer, which can be compensated through known connections.

Fig. 6 shows an arrangement of this type, in which the measuring electrode 4 and the auxiliary electrode 12 are connected through an alternating current transformer 24 and potentiometer 16 to the amplifier 8.

A depolarization, which is at least frequent or preferably permanent, between the measuring electrode and the auxiliary electrode is especially advantageous when the concentration of complex salts of cadmium is to be measured according to the invention, since, in long drawn out measurements, cadmium is likely to alloy with the electrodes and thereby to produce delays in the desired measurement of the cyanide concentration.

It is further desirable, in order to stabilize the zero point at the smallest cyanide concentration, to connect a pH electrode, as shown in Fig. 7, and to arrange the calibration of the indicator as a pH value which shows the highest pH value which can occur during the measuring procedure.

In practice, it has been found that, in this operation of the electrode, a pH of 10.5 to 11 is especially advantageous, because by combining with the measurement a detoxification of cyanides by the addition of an oxidizing medium, such as sodium hypochlorite, the cyanide will be immediately destroyed according to the formula:

$$'CN + 'OCL \rightarrow 'CNO + 'Cl$$

At the same time a concurrent reaction proceeds according to the formula:

$$2'CNO + 2'OCl \rightarrow 2CO_2 + N_2 + 2'Cl$$

This reaction in the pH range of 10.5 to 11.5 occurs somewhat slowly so that by operating according to the invention the detoxification of the cyanide content can be carried out very effectively, the hypochlorite requirement and the requirement of other corresponding media sinks to half of the maximum. It is also advantageous for this reason to arrange for the carrying out of the measurement of the cyanide concentration in a solution which at the outset has a range of 10.5 to 11.5. If this alkali content is not present at the beginning in the solution to be measured and purified, the desired pH can be obtained according to the invention by adding to the solution a suitable quantity of alkali, advantageously along with the detoxification medium, for example the hypochlorite solution. It is especially desirable to mix the detoxifying medium with a suitable alkali and to add this mixture to the solution.

The following examples describe the use of the process.

*Example 1*

100 ml. of a solution of sodium cyanide in dilute caustic soda solution with a pH of 10.5 was brought into contact with the electrodes of the arrangement shown in Fig. 1. The electrodes were of silver, 2.5 cm. long and 0.4 cm. wide. The measurement gave an output of 174 mv. This measurement corresponded to a cyanide content of 2.5 mg./l. It indicated therefore a cyanide content in the solution of 0.25 mg.

A titrimetric test of the same solution with the same pH with n/200 silver nitrate solution with the addition of three drops of .02% KI solution was carried out. 1 ml. of the silver nitrate solution was used. This showed 0.26 mg. of cyanide. In the titration the point of reversal was determined by the first constant cloudiness of the titration solution which appeared under irradiation with ultraviolet light. Continuing the electric measurement, to a similar solution 0.763 mg. of an aqueous solution of n/100 silver hypochlorite was added. The indication of the measuring instrument varied directly with the addition of the oxidizing solution, and three seconds later stood at −160 mv. corresponding to a cyanide value of zero.

During this test the current imposed by the battery 14 on the measuring electrode was 15 μA.

Upon the after titration of the solution with the addition of 1 drop of an n/200 silver nitrate solution, a distinct cloudiness appeared. The cyanide was by this treatment completely destroyed in a very short time so that not even traces could be detected.

*Example 2*

The same procedure using gold electrodes gave an indication of 300 mv. on the measuring instrument corresponding to a cyanide content of 2.5 mg./l.

*Example 3*

A similar procedure with copper electrodes gave a reading of 363 mg./l.

*Example 4*

Cyanide containing waste water in a galvanizing plant was tested which was flowing at a rate of 3.6 m.³ per hour. The flow did not occur regularly, but intermittently. The content of cyanide also fluctuates in dependence on the operation of the reeling mechanism from minute to minute. In waste water there were present during a working hour, in the form of salts, the following:

70 g. NaCN
18 g. $[Cd(CN)_2]''$
60 g. $[Cu(CN)_4]''''$
36 g. $[Zn(CN)_2]''$

This corresponds to a cyanide content of 96.1 g. The monovalent copper in the copper complex (22.7 g.) consumes for its oxidation also sodium hypochlorite. These 22.7 g. of monovalent copper correspond in use of the oxidizing solution to 4.7 g. of cyanide so that a corrected cyanide value of altogether 100.8 g. is given.

Upon the addition of the detoxifying medium, in a quantity indicated by the measured value, within fifteen minutes the complex cyanides were completely destroyed. The measuring instrument showed then a cyanide value of zero. A slight excess of chlorine of 0.2 to 0.4 g.'OCl/l. was advantageous.

For the detoxification there was used in one hour 340 g. of sodium hypochlorite in a 15% solution, that is the molecular ratio of the detoxifying chemical to the cyanide was about 1:18 to 1. The greater consumption of the oxidation medium was due to the oxidation of the formed cyanates to $CO_2$ and $N_2$.

Fig. 8 shows the curve corresponding to the indications obtained with electrodes of differing composition, at a pH of 10.0, and without an auxiliary electrode. The ordinates show the reading in mv. while the abscissae show the cyanide content in mg./l.

Figs. 9 to 13 show the variation of the potential in accordance with the cyanide content at different pH values, without the use of an auxiliary electrode, for measuring electrodes formed of silver, gold, copper, platinum and V2A respectively.

Figs. 9a to 13a show the potential drop which is obtained in different pH ranges when an auxiliary electrode is used in dependence on the current imposed on the measuring electrode through the auxiliary electrode.

While we have described herein some embodiments of our invention, we wish it to be understood that we do not intend to limit ourselves thereby except within the scope of the claims hereto or hereinafter appended.

We claim:

1. A method of measuring the cyanide ion concentration of an aqueous solution, in which a measuring electrode and a reference calomel electrode are in contact with the solution and are connected in circuit with a measuring instrument so as to produce a voltage across the instrument, which comprises imposing across said measuring electrode and a third electrode which is in contact with the solution a potential which for at least a part of the time produces a reversal of direction of potential on the measuring electrode, whereby the measuring electrode at least to a small degree acts as a dissolving electrode, said measuring electrode being formed of at least one substance selected from the group consisting of metals and metal alloys which are at least as high in the electromotive series as copper, which in alkaline cyanide solutions form complex compounds wth the cyanides, and which are at least as noble as the noblest metal present in the solution.

2. A method of measuring the cyanide ion concentration of an aqueous solution, in which a measuring electrode and a reference calomel electrode are in contact with the solution and are connected in circuit with a measuring instrument so as to produce a voltage across the instrument, which comprises connecting in series with the measuring electrode an auxiliary electrode which is in contact with the solution and a source of current which at least for a part of the time imposes on the terminal of the measuring electrode which is connected to the measuring instrument a positive charge whereby the measuring electrode at least to a small degree acts as a dissolving electrode, said measuring and auxiliary electrodes being formed of at least one substance selected from the group consisting of metals and metal alloys which are at least as high in the electromotive series as copper, which in alkaline cyanide solutions form complex compounds with the cyanides, and which are at least as noble as the noblest metal present in the solution.

3. In a method as claimed in claim 2, said measuring and auxiliary electrodes being formed of the same metal.

4. In a method as claimed in claim 1, said potential being lower than the decomposition potential for hydrogen and for the noblest metal present in the solution.

5. In a method as claimed in claim 1, said potential lying within the range of 5 to 20 microamperes per square decimeter of the surface of the measuring electrode.

6. In a method as claimed in claim 2, said source being a source of alternating current.

7. In a method as claimed in claim 1, said solution having a pH above 7.0.

8. In a method as claimed in claim 1, said solution having a pH between about 10.5 and 11.0.

9. In a method as claimed in claim 2, the step of maintaining the solution in contact with the electrodes in motion.

10. In a method as claimed in claim 2, the step of pretreating the measuring and auxiliary electrodes with an aqueous solution of a substance selected from the group consisting of sodium cyanide and ammonia for a sufficient time to produce depolarization.

11. In a method as claimed in claim 2, the step of passing across the measuring and auxiliary electrodes a current of sufficient strength to evolve hydrogen in the solution for a sufficient length of time to produce depolarization.

12. In a method as claimed in claim 2, the step of passing across the measuring and auxiliary electrodes a current of sufficient strength to produce solution of the metals of the electrodes for a sufficient length of time to produce depolarization.

13. In apparatus for measuring the concentration of cyanide ions in aqueous solution which comprises a reference calomel electrode, a measuring electrode, a circuit connecting said reference and measuring electrodes and a measuring instrument operatively connected to said circuit, an auxiliary electrode and a source of current, a circuit connecting said auxiliary electrode and source of current to the measuring electrode, said circuit imposing a potential on the terminal of the measuring electrode which is connected to the measuring instrument a positive charge, a glass electrode, means connecting said glass electrode to the terminal of said reference electrode which is connected to the measuring instrument, and a source of current in said last connecting means, whereby to balance the potential derivations caused by changes in the pH of the solution, said measuring and auxiliary electrodes being formed of at least one substance selected from the group consisting of metals and metal alloys which are at least as high in the electromotive series as copper, which in alkaline cyanide solutions form complex compounds with the cyanides, and which are at least as noble as the noblest metal present in the solution.

References Cited in the file of this patent

UNITED STATES PATENTS 1,529,249     Gue                  Mar. 10, 1925

OTHER REFERENCES

Electrode Potential Behaviour of Corroding Metals in Aqueous Solutions, published in 1938, by Clorendon Press, Oxford, England, pp. 235–239, 248–252 and 274.

Journal of Corrosion, January-February 1948, pp. 15–20 (article by Marsh).